UNITED STATES PATENT OFFICE.

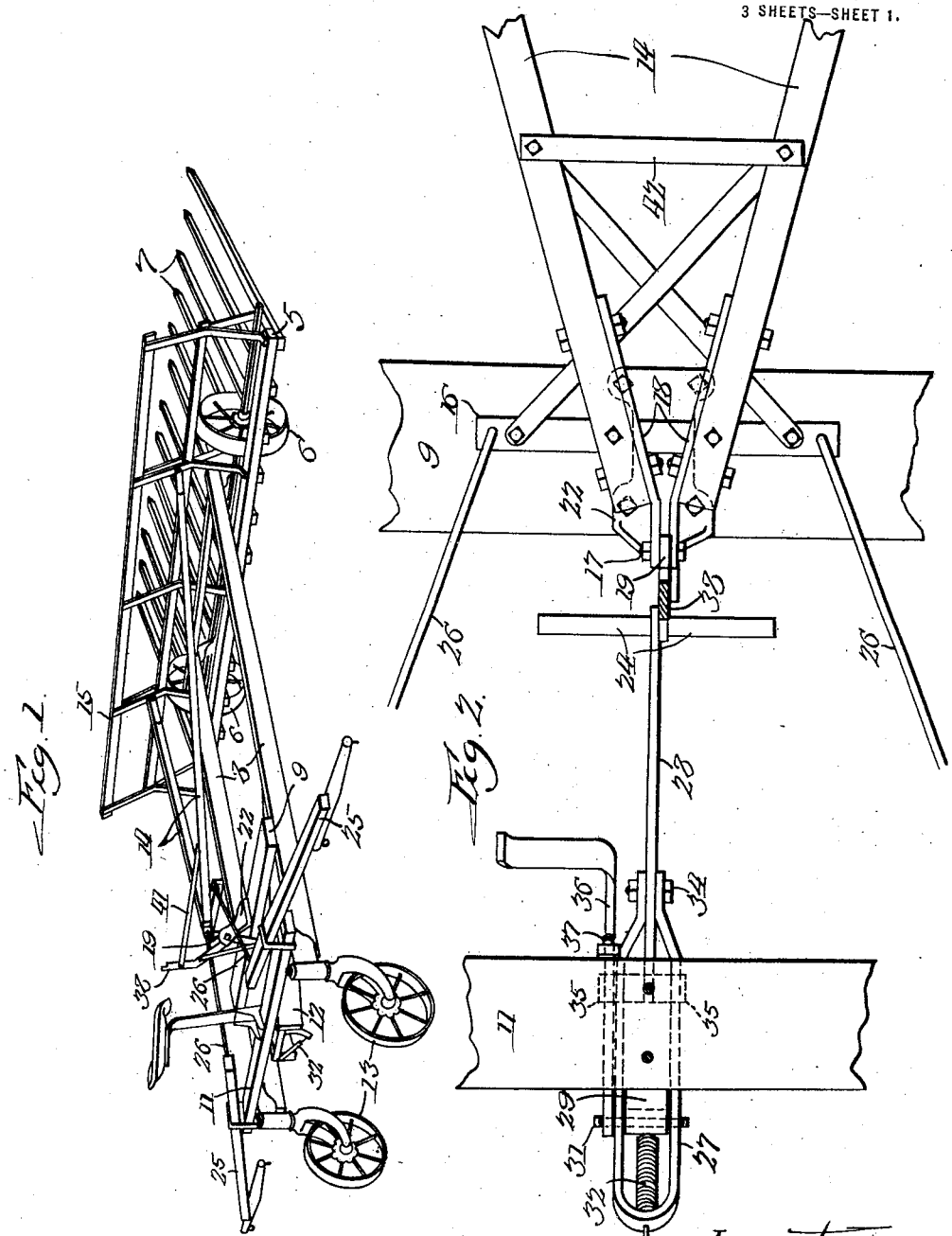

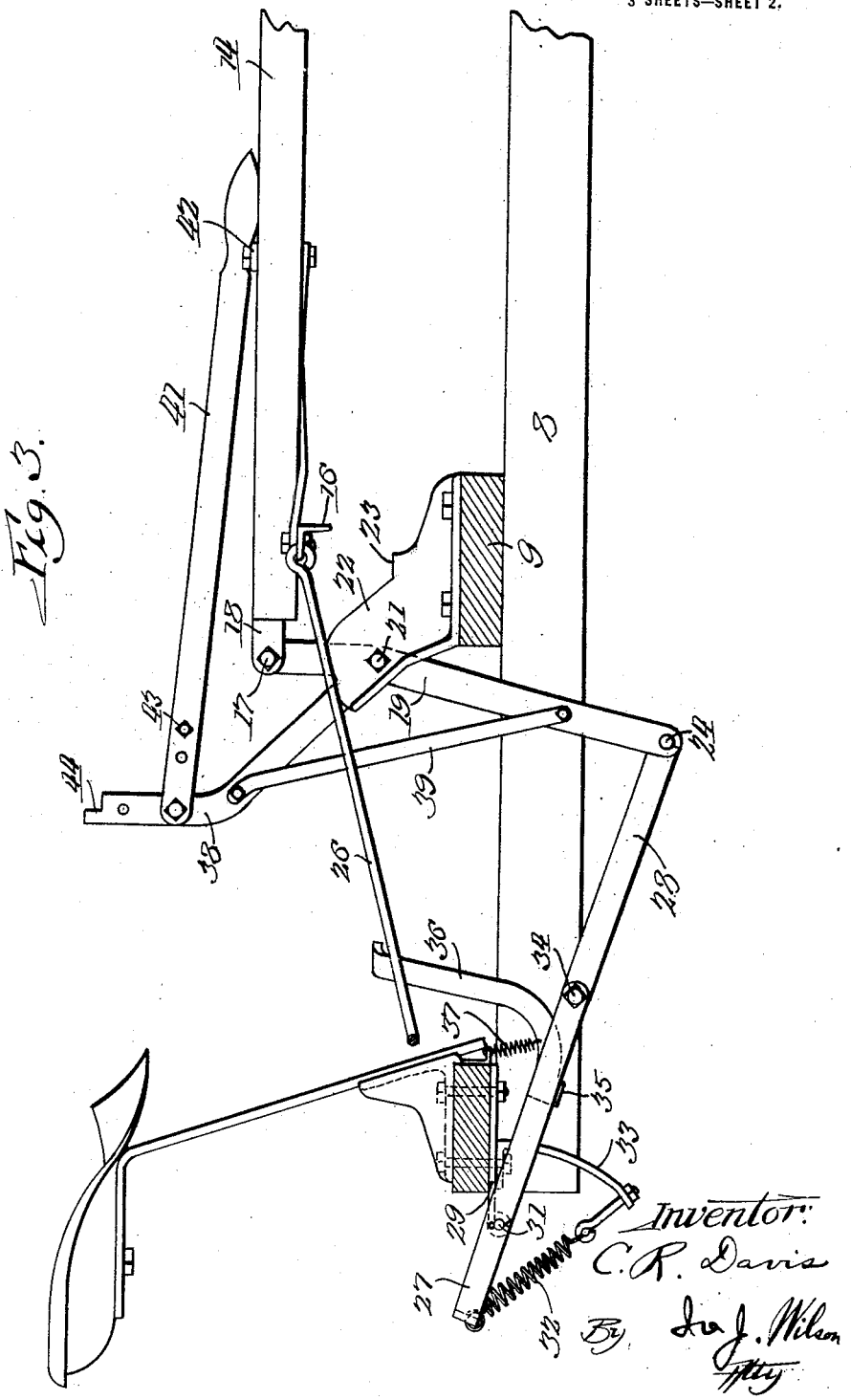

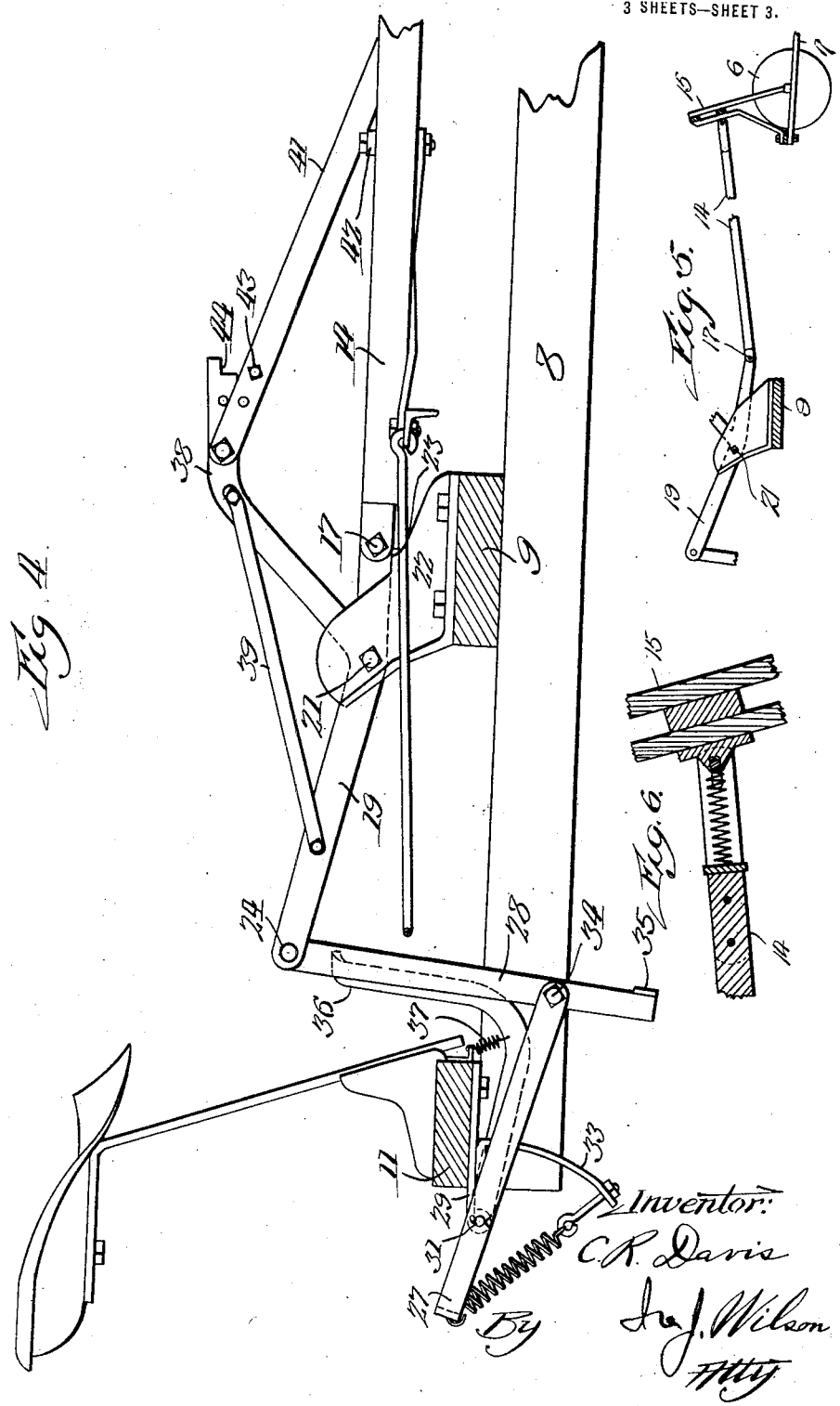

CALVIN R. DAVIS, OF ROCKFORD, ILLINOIS, ASSIGNOR TO EMERSON-BRANTINGHAM COMPANY, OF ROCKFORD, ILLINOIS, A CORPORATION OF ILLINOIS.

POWER-LIFT SWEEP RAKE.

1,404,010.          Specification of Letters Patent.          Patented Jan. 17, 1922.

Application filed November 30, 1917. Serial No. 204,587.

*To all whom it may concern:*

Be it known that I, CALVIN R. DAVIS, a citizen of the United States, residing at Rockford, in the county of Winnebago and State of Illinois, have invented certain new and useful Improvements in Power-Lift Sweep Rakes, of which the following is a specification.

This invention relates to that class of rakes known as sweep or push rakes, in which the horses walk behind a rake head and are hitched to a rear truck connected with the rake head so that the latter is pushed from behind. A rake of this character is used to gather hay from a windrow and convey the hay to and deposit it on a stacker. It is necessary in the operation to raise and lower the rake teeth so that when gathering the hay the teeth rest upon and follow the ground, and when a load has been gathered the teeth, and consequently the load, may be raised to an elevated position.

The present invention has reference to the means for raising and lowering the rake teeth, and the primary object is to provide improved means by which power from the draft is employed to raise the rake teeth to elevated position and to provide for automatically locking the teeth in this position, the raising and locking being accomplished without any attention or assistance from the operator except to actuate a single lever which puts the raising mechanism into operation.

Another object is to provide an improved mechanism for raising and lowering the rake teeth in which the teeth, when locked in elevated position as just mentioned, may be lowered at will by the operator actuating a tripping or release lever by foot, whereupon the rake teeth and the load will be lowered and automatically locked in lowered position. And by foot actuation the mechanism may be released from this locked position, allowing the power means above mentioned to elevate the rake and the load. It will thus be seen that I have contemplated the provision of an improved mechanism for raising the rake teeth by power and in which the teeth are automatically locked in both raised and lowered positions and are releasable from such positions by foot operation. Consequently, the operator has the free use of his hands in driving and managing the horses and need give practically no attention to the power lift mechanism, since it is only necessary when desiring to raise or lower the rake teeth, to actuate the mechanism by simple foot operation, such as pressing on a lever to release or trip it from a locked position.

In rakes of this character heretofore provided, systems of levers are employed for raising and lowering the rake teeth, including an upstanding hand lever disposed just forwardly of the operator and movable in a fore-and-aft direction during the raising and lowering movement. The hand lever thus arranged is not only an obstruction in front of the driver but is a source of danger causing frequent injury, since when the load is lowered from raised position the lever is swung quite rapidly through a wide range of movement to its opposite position and thus being dangerous to anyone standing nearby or holding the lever. I have, therefore, aimed to overcome this objection by the provision of a novel raising and lowering mechanism in which the hand lever is normally disposed in a lowered inoperative position out of the way during both the raising and lowering movements. The hand lever may, however, be employed at will and operated to raise the load by hand, when for instance in the operation, a snag or some obstruction has been encountered and the power lift cannot be used. Thus, the hand lever is, in effect, an emergency lifting lever, normally disposed out of the way when not in use, but adapted to be used at any time when necessary for lifting the load.

Other objects and attendant advantages will be more fully appreciated as the invention becomes better understood by reference to the following description when considered in connection with the accompanying drawings, in which—

Figure 1 is a perspective view of a sweep rake embodying my improvements, showing the rake teeth raised;

Fig. 2 is an enlarged plan view of the power lift mechanism;

Figs. 3 and 4 are enlarged side elevations of the power lift mechanism locked in positions with the rake teeth raised and lowered, respectively;

Fig. 5 is a diagrammatic view showing the relation of the pivotal connections between the rake head, reach bar and lifting lever; and Fig. 6 is a vertical detail sectional view showing the yieldable spring and pivotal connection between the rake head and the reach bars 14.

In considering this invention, it should be understood that the rake head and the push truck may be of any suitable or preferred design, since its specific construction forms no part of the present invention. These parts, well known in the art, consist of a rake head designated generally by reference character 5, supported on wheels 6 and equipped with rake teeth 7 adapted to be swung to raised and lowered positions by rocking the rake head about the wheel pivots, and a push truck consisting of fore-and-aft frame bars 8 joined by transverse front and rear bars 9 and 11 respectively, braced by the oblique bars 12, and caster wheels 13 supporting the rear end of the truck. The frame bars 8 of the truck are suitably connected at their forward ends to the rake head, generally to the axle thereof, and the rake head is adapted to be rocked about the axle by means of a reach bar structure consisting of rearwardly converging bars 14 pivotally connected at their forward ends to the upstanding back 15 of the rake head, through the agency of a yieldable spring connection, (Figure 6) permitting a certain amount of flexibility, so that the rake teeth may yield when passing over small obstructions and uneven ground.

The reach bars 14 secured together at their rear ends by a transverse angle bar 16 bolted thereto, are pivotally connected at 17 through the agency of strap irons 18, to the upper end of a lifting lever 19 which is pivoted intermediate its ends at 21 on a bracket 22 in turn secured to the transverse frame bar 9. By rocking this lever 19 which is pivoted on the truck, it will be obvious that forward and backward movement will be imparted to the reach bar structure, thereby respectively lowering and raising the rake teeth. When the rake teeth are in raised position the lifting lever 19 is disposed in a substantially upright position, as shown in Fig. 3, and locked in such position by means described hereinafter, and when the rake teeth are lowered the lifting lever assumes a horizontally disposed position as shown in Fig. 4. In this latter position, it will be noted that the forward end of the lever rests on an abutment 23 which limits movement of the lever in a clockwise direction to a position in which the center of the pivotal connection 17 is moved beyond a line between the centers of the pivot 21 and the forward pivots of the reach bars. In other words, the reach bar structure 14 and the lifting lever 19 are arranged to effect a dead-center lock when the rake teeth have been lowered. The parts are held in this locked position mainly through the weight of the rake teeth and the reach bar structure and are further held in such position through the agency of the draft when the machine is in operation and further, through a spring pressure employed in another locking device described later. Consequently, the rake teeth are effectually locked in lowered position. The longer end of the lifting lever is equipped with foot stirrups or rests 24 adapted to be easily actuated or depressed from the position shown in Fig. 4, by an operator seated on the machine, to release the parts from locked position, just described, by raising the pivotal point 17 above the center line mentioned. It will be obvious that by continuously pressing on the foot rests 24 it would be possible to swing the lifting lever 19 to the upright position shown in Fig. 3 and to entirely raise the rake teeth, but in view of the fact that considerable power is necessary to raise the rake teeth when loaded, power operated means is employed in the raising operation. The power utilized is draft from the horses and is applied through eveners 25 pivotally mounted on the transverse frame bars 11 and pivotally connected at their inner ends to the rear end of the reach bar structure through the agency of links 26 connected to the transverse angle irons 16 on the reach bar structure. When the rake is being pushed ahead by horses hitched to the eveners 25, the draft will be continuously applied in a rearward pull on the reach bar structure. Thus, when the rake teeth are lowered (in which position the parts are shown in Fig. 4) and the rake is being pushed ahead, the rearward pull of the draft on the reach bar structure will serve to hold the shorter end of the lifting lever 19 down on the abutment 23, and consequently, to hold the parts in locked position. When, however, the operator desires to raise the load, it is only necessary to depress the foot rest 24 sufficiently to raise the pivot 17 above the dead-center position, whereupon the parts will be free to be moved by the backward pull of the draft which will thereupon fully elevate the rake teeth and the load, moving the parts to the position shown in Fig. 3.

When the rake teeth have been thus moved by power to the elevated position, they will be automatically locked therein by a locking device which will now be described. This, generally stated, consists of a pair of locking links, one of which is connected to the longer end of the lifting lever 19, and which are arranged to effect a dead-center lock and are adapted to be released from such locked position by a foot tripping or releasing lever. The links are designated generally as a spring-pressed link 27 and a lever-connected link 28. The spring-pressed link in this instance, is of general U-shape, providing spaced arms which straddle a supporting strap iron 29 secured to and extending rearwardly from the rear frame bar 11, and is pivotally secured to the support 29 through means of a pivot pin 31. A contractile spring 32 connected at one end to the rear end or arch of the link 27 and at its opposite end adjustably connected to the lower end of a depending fixed part 33, constantly urges the link 27 about its pivot 31 in a counter-clockwise direction viewing Fig. 3. The link 28 pivotally connected intermediate its ends at 34 to the forward end of the link 27, is provided at its rearmost end with laterally extending stops 35 adapted to abut against the underside of both arms to the link 27 and limit relative pivotal movement between the links 27 and 28 in one direction when the pivot 34 has moved upwardly beyond a dead-center line between the pivots 34 and 21. This movement is caused, as will be obvious, by returning of the lifting lever 19 from the position shown in Fig. 4 to that shown in Fig. 3, and finally by the spring pressure urging the pivotal point 34 upwardly. It follows, therefore, that when the rake teeth have been fully lifted by power they will be automatically locked in such elevated position by the locking means just described since when the links 27 and 28 have been locked they positively hold the lifting lever 19 against movement in a direction to lower the rake teeth. The weight of the load and the tendency of the lifting lever 19 to move in a clockwise direction simply hold the locking links tighter in this locked position, this pressure being applied in a rearward thrust on the locking links. A tripping lever is now provided for breaking the locking effect of the links 27 and 28 and takes the form of a lever 36 pivotally mounted on the pivot pin 31 and arranged to overlie one of the stops 35 so that when the upper end of the lever is depressed by foot the pivot 34 of the links will be moved below the dead-center locking position thereby rendering the lifting lever 19 free to swing in a clockwise direction under the influence of the weight of the rake teeth and the load, to a position shown in Fig. 4, in which the parts are automatically locked in the manner mentioned above. When the rake teeth are thus lowered, it will be noted that the lifting lever 19 is urged into locked position under the influence of the spring 32 which exerts an upward thrust on the locking link 28. The tripping lever 36 is yieldingly held in inoperative position by means of a contractile spring 37. When lowering the rake teeth and the load, it will be obvious that the rake is at a standstill and the draft connections are slackened so that the rake teeth and load are free to drop by their own weight.

Means is also provided by which the operator may lift the rake teeth and the load by hand and also foot operation, under certain emergency conditions, such for instance as when in operation the rake teeth run into a snag or some other obstruction, it is desirable to lift the rake teeth when the rake is at a standstill. For this purpose the lifting lever 19 is provided with an extension 38 braced by a strut 39 and equipped at its free end with a pivoted emergency hand lever 41. This hand lever normally extends downwardly resting on the cross piece 42 on the reach bar structure and is simply shifted back and forth in a horizontally disposed plane entirely out of the way of the operator when the rake teeth are raised and lowered by the means above described. The lever 41 is provided with a bolt 43 adapted when the lever is swung rearwardly, to engage the lever extension 38 at 44, thereby effecting a one-way connection so that when the operator pulls rearwardly on the lever 41, the lifting lever 19 will be swung in a counter-clockwise direction, in which to raise the rake teeth. It will be observed that the lifting lever is, therefore, of sectional construction providing an emergency lever normally disposed in an inoperative out-of-the-way position and in no way affecting or interfering with the operation of the lifting lever in raising the teeth by power and in lowering the teeth. Thus, the hand lever 41 forms no such obstruction ahead of the driver, nor source of danger in its back and forth movement as in the case of the rigid upstanding hand levers employed in some form or other in prior constructions. When it is desired to raise the rake teeth and load in an emergency, without the assistance of the power lift, the operator generally uses both foot and hand power, pressing downwardly by foot on the rests 24 and pulling rearwardly on the hand lever 41, the parts being automatically locked in elevated position when such position is reached, in the same manner as when the parts are raised by power from the draft.

The terms "dead-center lock" and "dead-center locking position" are used in the description and claims as general descriptive terms in referring to the means for locking the lever 19 in teeth-lowered position and to the locking links for locking the lever in teeth-raised position, it being understood, of course, that in such locking arrangements the center of one of the pivoted members is generally moved slightly beyond the dead-center line between the pivotal points involved, to thereby secure the locking effect.

It is believed that the foregoing conveys a clear understanding of the principles and operation of my improvements and of the objects prefaced above, and it should be understood that while I have illustrated one working embodiment of my improvements for purpose of illustration, various changes might be made in the arrangement and construction without departing from the spirit and scope of the invention as expressed in the appended claims.

I claim:

1. In a sweep rake, the combination with a rake head having teeth movable to raised and lowered positions, of a two-part lifting lever connected with the rake teeth for raising and lowering the same, one part of said lever being in the form of an emergency lever normally inoperative, but adapted to be operated at will for raising the rake teeth, power means for lifting the rake teeth, and foot releasable means for automatically locking the lifting lever in position when the rake teeth have been raised by said power means.

2. In a sweep rake, the combination with a rake head having teeth movable to raised and lowered positions, of a lifting lever connected with the rake teeth through the agency of a reach bar for raising the rake teeth, the lifting lever and reach bar being so co-operatively arranged as to effect a toggle lock for holding the reach bar in a locked position in which the rake teeth are lowered, said lever being foot releasable from its locked position, draft means connected with the lever so that power of the draft will be applied, when the lever is released from said locked position, to raise the rake teeth, and foot releasable locking means for automatically locking the lever in position when the rake teeth have been moved to raised position by power of the draft.

3. In a sweep rake, the combination with a rake head having teeth movable to raised and lowered positions and a rear truck connected with the rake head, of an upright lever pivoted intermediate its ends on the truck, a reach bar structure pivotally connected at its rear to the upper end of said lever and at its forward end with the rake head so that upon rocking the lever the rake teeth will be raised and lowered, said lever being arranged so that when the rake teeth have been moved to one position its pivotal connection with the rear end of the reach bar structure will move to a substantially dead-center locking position and thereby be automatically locked, and locking means connected with the lower end of the lever and adapted, when the lever has been released from said locked position and moved to an upright position, to lock the lever in such upright position.

4. In a sweep rake, the combination with a rake head, the teeth of which are movable to raised and lowered positions, of lever means for raising and lowering the rake teeth, foot releasable locking means holding the lever means in position with the rake teeth raised, said lever means being arranged to automatically lock in position when the rake teeth have been lowered, draft means so connected with the lever means that power from the draft is utilized in part to hold the lever means locked in said teeth-lowered position and is further utilized, when the lever means is released from this locked position, to raise the rake teeth until the lever means is automatically locked in its first mentioned position.

5. In a sweep rake, the combination with a rake head the teeth of which are movable to raised and lowered positions, of means for so moving the rake teeth, means operated by power from the draft to hold the raising and lowering means in locked position with the rake teeth lowered and adapted to be further operated by power from the draft when said raising and lowering means is released from locked position, to operate said means and move the rake teeth to raised position, and means for automatically locking the raising and lowering means in position when the rake teeth have been raised.

6. In a sweep rake, the combination with a rake head having rake teeth adapted to be raised and lowered, a rear truck connected to the rake head, and a reach bar structure connected to the rake head and adapted by a pulling and pushing movement to raise and lower the rake teeth, of a lever on the truck connected to the reach bar structure for operating the same, draft means connected with the reach bar structure for pulling rearwardly thereon to raise the rake teeth, the lever being arranged to be held locked by the draft when the rake teeth have been lowered and adapted to be released at will from such locked position, whereupon the draft will be applied through the agency of the reach bar structure to raise the rake teeth, and means co-operating with the lever for automatically locking it in position when the rake teeth have been raised by power from the draft.

7. A lifting device for sweep rakes of the character described comprising a frame, a lever pivoted intermediate its ends on the frame, a reach bar structure connected at its rear end to the lever at one side of its pivot and connected at its forward end with the rake teeth for raising and lowering the same, a stop for limiting pivotal movement of the lever in one direction so that when the rake teeth have been lowered the pivot between the reach bar structure and lever will be moved to a substantially dead-center locking position, draft means connected with the reach bar structure for pulling rearwardly thereon so that when the lever is released from said locked position the power of the draft will be employed to lift the rake teeth, a pair of pivotally connected locking links one mounted on a fixed pivot and the other pivotally connected to the lever on the side thereof opposite from said reach bar connection, a stop for effecting a substantially dead-center lock between said locking links when the rake teeth have been raised, this stop serving to hold the parts locked with the rake teeth elevated and being releasable from such locked position to permit the rake teeth to be lowered.

8. In a lifting device for sweep rakes, the combination of a frame, a lever pivoted thereon and connected at one side of its pivot with the rake teeth so that upon rocking the lever the rake teeth will be raised and lowered, means causing said lever to be automatically locked in position when the rake teeth have been lowered, draft means, the power of which is employed to raise the rake teeth and the load, a foot stirrup carried by the lever and adapted to be operated to trip the lever from its locked position whereupon the rake teeth will be elevated by power from the draft and also whereby in the absence of draft power the rake teeth may be raised by pressure on the foot stirrup, means connected to the foot stirrup end of the lever for automatically locking the lever in position when the rake teeth have been elevated, and foot operable means for releasing said locking means and permitting the rake teeth to be lowered.

9. In a lifting device for sweep rakes, the combination of a frame, a lever pivoted thereon and connected with the rake teeth so that upon operation of the lever the rake teeth may be raised and lowered, the lever being limited in its movement when the rake teeth have been lowered and locked in such position, locking links connected to the lever to effect a substantially dead-center lock when the lever has been moved to a position in which the rake teeth are raised, a spring urging the locking links into locked position, the links being releasable from such position to permit the rake teeth to be lowered, and the locking links and lever being so arranged and the spring pressure so applied as to urge the lever into locked position with the rake teeth lowered.

10. In a sweep rake, the combination of a main frame, a tiltable rake head at the forward end thereof, a lifting lever pivoted on the main frame, and a reach bar structure connected at its forward end with the rake head and adapted to be moved lengthwise for tilting the same to raise the rake teeth and pivotally connected at its rear end directly to said lifting lever, the pivot of the lifting lever, the pivotal connection of the lever with the reach bar, and the connection of the reach bar with the tiltable rake head being so relatively arranged that when the rake teeth have been lowered the pivot between the lever and reach bar will be disposed in a substantially dead-center locking position whereby to lock the reach bar against movement in a direction to raise the rake teeth.

11. In a sweep rake, the combination of a main frame, a tiltable rake head at the forward end thereof, a lifting lever pivoted on the main frame, and a reach bar structure connected at its forward end with the rake head and adapted to be moved lengthwise for tilting the same to raise the rake teeth and pivotally connected at its rear end directly to said lifting lever, the lifting lever having a foot-actuable end extending rearwardly from its pivot when the rake teeth are lowered and in this position having its pivotal connection with the reach bar disposed forward of and in substantially dead-center relation to its said frame pivot to effect a toggle lock for holding the reach bar against movement in a direction to raise the rake teeth, and whereby said toggle lock will be broken by downward pressure on said rear end of the lifting lever.

12. In a sweep rake, the combination of a main frame equipped at its forward end with rake teeth adapted to be raised and lowered, a reach bar connected at its forward end with the rake teeth and adapted to be moved rearwardly for raising the same, a lifting lever horizontally disposed when the rake teeth are lowered and pivotally connected at its forward end to the rear end of the reach bar, the lifting lever being pivotally mounted on the frame at the rear of said pivotal connection with the reach bar and having an arm extending rearwardly from its pivotal mounting and adapted to be depressed by foot pressure for pulling the reach bar rearwardly to raise the rake teeth, and draft means connected with the reach bar for exerting a rearward pull thereon to lift the rake teeth, said pivotal connection between the lifting lever and the reach bar being arranged to move downwardly in front of the pivotal mounting of the lifting lever to a substantially dead-center locking position when the rake teeth have been lowered.

13. In a sweep rake, the combination of a main frame equipped at its forward end with rake teeth adapted to be raised and lowered, a reach bar connected at its forward end with the rake teeth and adapted to be moved rearwardly for raising the same, a lifting lever horizontally disposed when the rake teeth are lowered and pivotally connected at its forward end to the rear end of the reach bar, the lifting lever being pivotally mounted on the frame at the rear of said pivotal connection, and a hand lever pivotally mounted on said lifting lever and having a one-way connection therewith, allowing the hand lever to assume a lowered inoperative position at all times but permitting the hand lever to be raised and brought into co-operative relation with the lifting lever for operating the same to lift the rake teeth.

14. In a sweep rake, the combination of a main frame, a tiltable rake head, means mounted on the frame and operated by draft for raising the rake teeth, said means including an oscillatory part, and a hand lever pivotally mounted thereon and having a one-way connection therewith whereby the hand lever will assume a lowered inoperative position during oscillation of said part and whereby the hand lever may be raised from said inoperative position and brought into co-operative relation with said part for actuating the same to raise the rake teeth.

15. In a sweep rake, the combination of a main frame, a tiltable rake head, a reach bar connected at its forward end with the rake head and adapted to be pulled rearwardly for tilting the rake head to raise the teeth, a lifting lever pivotally mounted on the main frame and having a pivotal connection directly with the rear end of the reach bar so that by actuation of said lever the reach bar will be pulled rearwardly to raise the rake teeth, and an emergency hand lever pivotally mounted on the lifting lever, normally disposed in an inoperative position and adapted to be operated at will for moving the lifting lever in a direction to raise the rake teeth.

16. In a sweep rake, the combination of a main frame, a tiltable rake head, and means on the main frame for tilting the rake head to raise and lower the rake teeth, said means having parts arranged to be moved into locking positions when the rake teeth are raised and lowered, and including a single spring so arranged as to hold said parts in both said locking positions.

17. In a sweep rake, the combination of a frame, a tiltable rake head, a reach bar for tilting the rake head, a lifting lever pivotally mounted on the frame and shaped to provide a portion extending forwardly from its pivot and pivotally connected to the rear end of the reach bar, a portion extending rearwardly from said pivot and equipped with a foot stirrup adapted to be depressed for drawing the reach bar rearwardly to raise the rake teeth, and provided intermediate said reach bar connected portion and the foot stirrup portion with an upstanding portion adapted to carry an emergency lever, and an emergency hand lever pivotally mounted on said upstanding portion.

18. In a sweep rake, the combination of a main frame, rake teeth adapted to be raised and lowered, a reach bar connected with the teeth, draft means connected with the reach bar for drawing the same rearwardly, a lifting lever pivotally mounted on the main frame and having an arm pivotally connected directly to the rear end of the reach bar and an oppositely extending arm equipped with a foot stirrup, the lifting lever being movable to a position in which its pivotal connection with the reach bar is moved into substantially dead-center locking relation with the lever pivot and the forward end of the reach bar, and means connected to the stirrup arm of the lifting lever for locking the latter in position when the rake teeth have been elevated.

19. In a sweep rake, the combination of a main frame, rake teeth adapted to be raised and lowered, a reach bar for raising and lowering the rake teeth, a lifting lever pivoted on the main frame and pivotally connected directly to the rear end of the reach bar, the lifting lever and the reach bar constituting a toggle lock for holding the rake teeth in lowered position, and draft means connected with the reach bar and adapted when the toggle lock is tripped to raise the rake teeth by power.

20. In a sweep rake, the combination of a main frame, rake teeth adapted to be raised and lowered, a reach bar for raising and lowering the rake teeth, a lifting lever pivoted on the main frame and pivotally connected directly to the rear end of the reach bar, the lifting lever and the reach bar constituting a toggle lock for holding the rake teeth in lowered position, and draft means connected with the reach bar and adapted when the toggle lock is tripped to raise the rake teeth by power, a pair of pivotally connected toggle links one of which is pivotally mounted on the main frame and the other pivotally connected to the lifting lever, and a spring for causing said toggle links to automatically lock the lifting lever in position when the rake teeth have been elevated.

21. In a sweep rake, the combination of a main frame, rake teeth adapted to be raised and lowered, a reach bar connected with the rake teeth and movable rearwardly for raising the same, a lifting lever pivoted on the main frame and connected forwardly of its pivot to the rear end of the reach bar when the latter is in its forward position with the rake teeth lowered, the lifting lever having a rearwardly extending arm adapted to be depressed by foot pressure to draw the reach bar rearwardly, a pair of pivotally connected toggle links in operative connection between said rear arm of the lifting lever and the frame for automatically locking the lifting lever in position when the rake teeth have been raised, and a tripping lever adapted to be depressed by foot pressure for unlocking said toggle levers and permitting the teeth to lower.

CALVIN R. DAVIS.